(12) United States Patent
Otake et al.

(10) Patent No.: US 9,998,631 B2
(45) Date of Patent: Jun. 12, 2018

(54) INFORMATION PROCESSING APPARATUS, METHOD FOR PROCESSING INFORMATION, AND COMPUTER PROGRAM

(71) Applicant: CANON KABUSHIKI KAISHA, Tokyo (JP)

(72) Inventors: Ritsuko Otake, Tokyo (JP); Junya Arakawa, Nagareyama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days. days.

(21) Appl. No.: 15/208,425

(22) Filed: Jul. 12, 2016

(65) Prior Publication Data
US 2017/0019568 A1    Jan. 19, 2017

(30) Foreign Application Priority Data

Jul. 13, 2015    (JP) .................................. 2015-140042

(51) Int. Cl.
*H04N 1/40*    (2006.01)
*H04N 1/60*    (2006.01)
*H04N 1/407*    (2006.01)

(52) U.S. Cl.
CPC ......... *H04N 1/6027* (2013.01); *H04N 1/4072* (2013.01); *H04N 1/6005* (2013.01); *H04N 1/6008* (2013.01)

(58) Field of Classification Search
None
See application file for complete search history.

(56) References Cited

U.S. PATENT DOCUMENTS

| 6,618,171 | B1 | 9/2003 | Tse et al. |
| 7,551,334 | B2* | 6/2009 | Li ........................ H04N 1/4072 |
| | | | 358/3.23 |
| 7,880,924 | B2* | 2/2011 | Lowman .................. H04N 1/00 |
| | | | 358/1.9 |

(Continued)

FOREIGN PATENT DOCUMENTS

| EP | 0803842 A2 | 10/1997 |
| JP | 2012-095002 A | 5/2012 |

OTHER PUBLICATIONS

Lu, et al., "Binarization of Badly Illuminated Document Images through Shading Estimation and Compensation", Ninth International Conference on Document Analysis and Recognition, IEEE, Piscataway, NJ, USA, XP031157554, Sep. 1, 2007, pp. 312-316.

*Primary Examiner* — Dung D Tran
(74) *Attorney, Agent, or Firm* — Canon USA, Inc. I.P. Division

(57) ABSTRACT

An information processing method includes calculating at least one difference value between a pixel value of a target pixel in an input image obtained by capturing a document image and a pixel value of a corresponding pixel in a shade component image at coordinates identical to those of the target pixel. The shade component image represents shade components of the input image. The shade components depend on an image capture environment. The method further includes correcting the pixel value of the target pixel in the input image based on a correction rate to correct a shade component in the target pixel. The correction rate depends on at least one difference value associated with the target pixel in the input image.

9 Claims, 12 Drawing Sheets

(56) References Cited

U.S. PATENT DOCUMENTS

| | | | |
|---|---|---|---|
| 8,384,952 B2* | 2/2013 | Hayasaki | H04N 1/642 |
| | | | 345/555 |
| 8,687,918 B2* | 4/2014 | Tamura | G06T 5/50 |
| | | | 345/632 |
| 2002/0006226 A1* | 1/2002 | Shiota | G06K 9/00241 |
| | | | 382/203 |
| 2003/0210411 A1 | 11/2003 | Sawada | |
| 2006/0092483 A1* | 5/2006 | Lowman | H04N 1/00 |
| | | | 358/505 |
| 2007/0002075 A1* | 1/2007 | Matsuda | G06T 5/40 |
| | | | 345/592 |
| 2011/0142365 A1 | 6/2011 | Sakagami et al. | |
| 2011/0274351 A1 | 11/2011 | Tsukada | |
| 2012/0141044 A1* | 6/2012 | Kwatra | G06T 5/008 |
| | | | 382/274 |
| 2013/0322747 A1 | 12/2013 | Ozawa | |
| 2014/0247980 A1* | 9/2014 | Bvn | H04N 5/272 |
| | | | 382/164 |
| 2017/0019569 A1* | 1/2017 | Arakawa | H04N 1/62 |

* cited by examiner

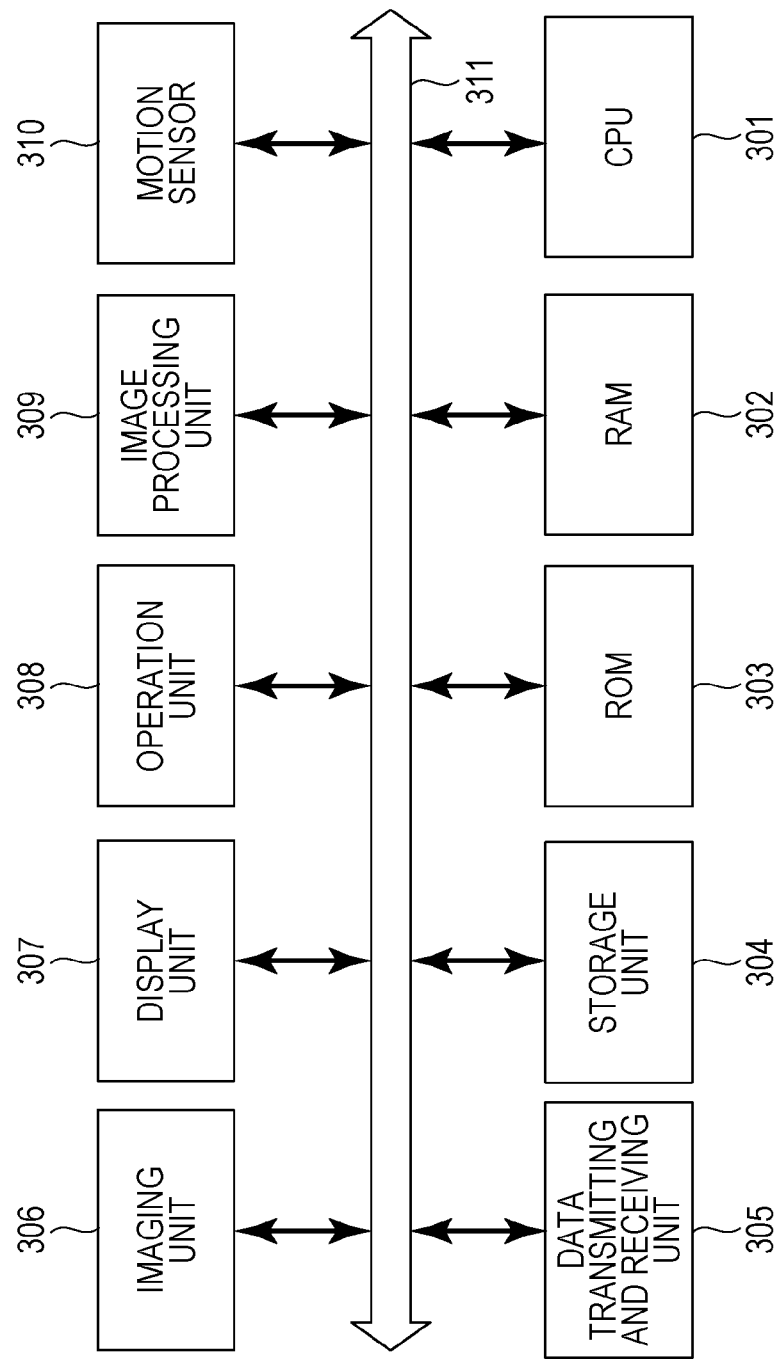

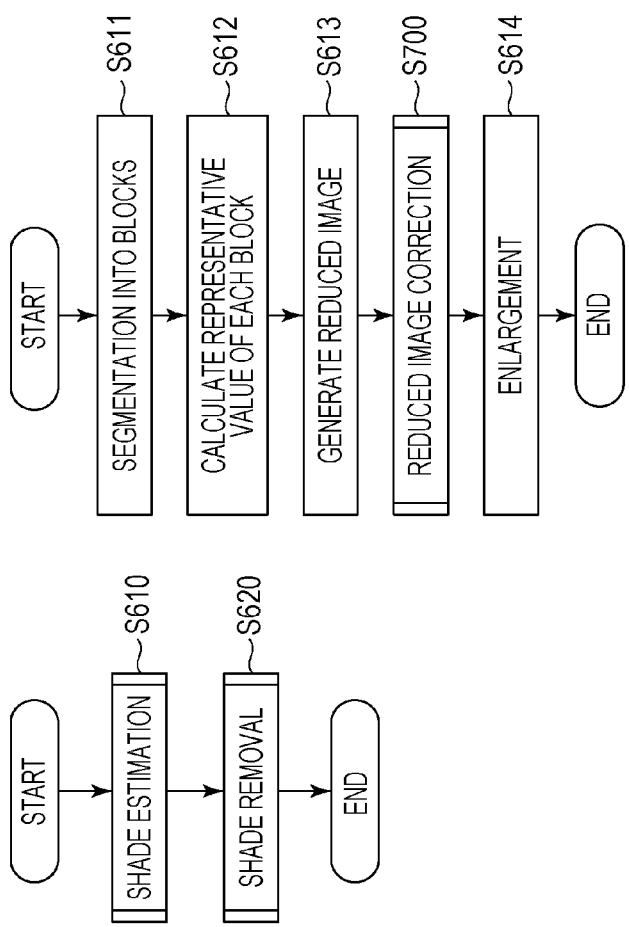

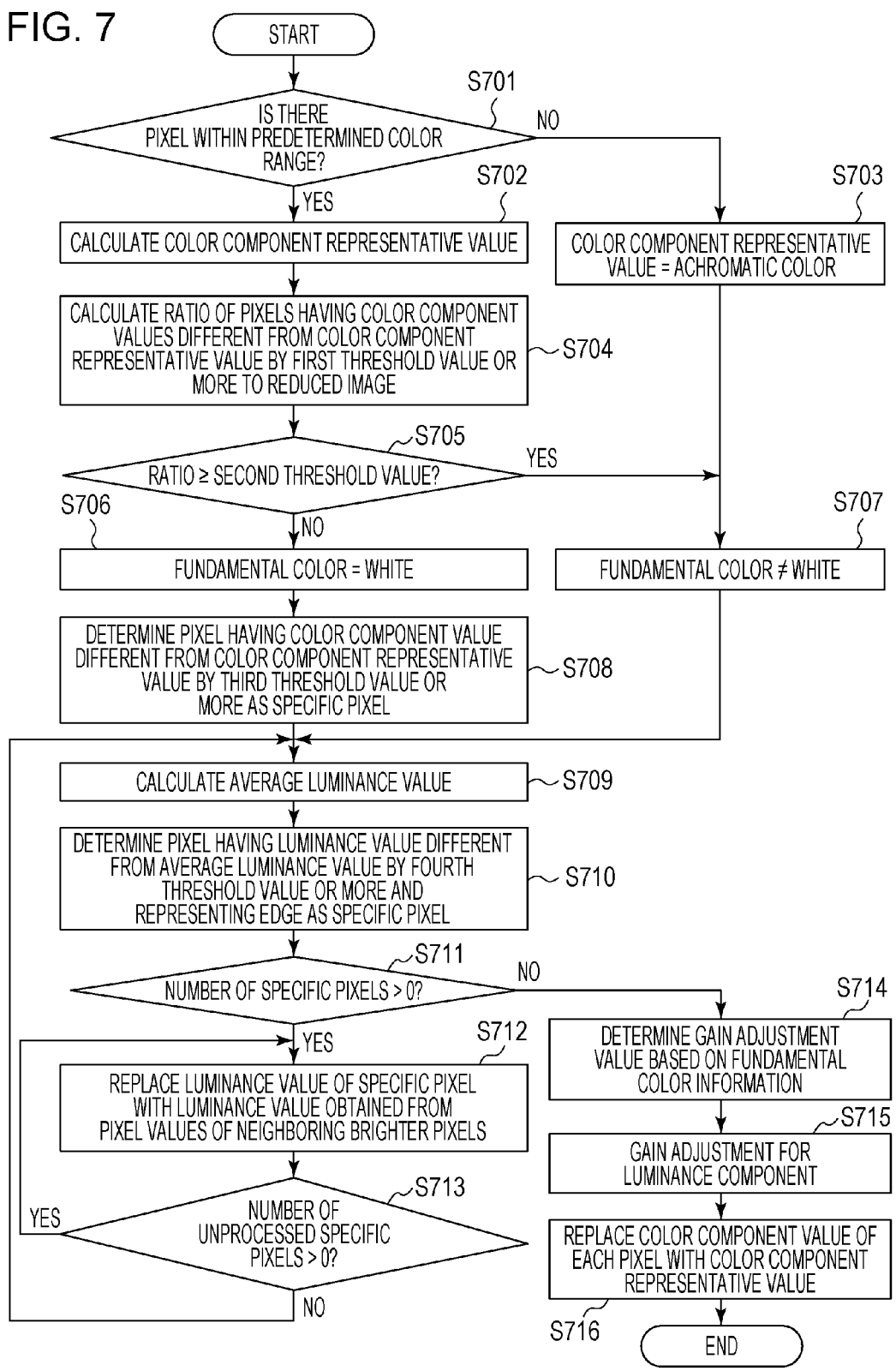

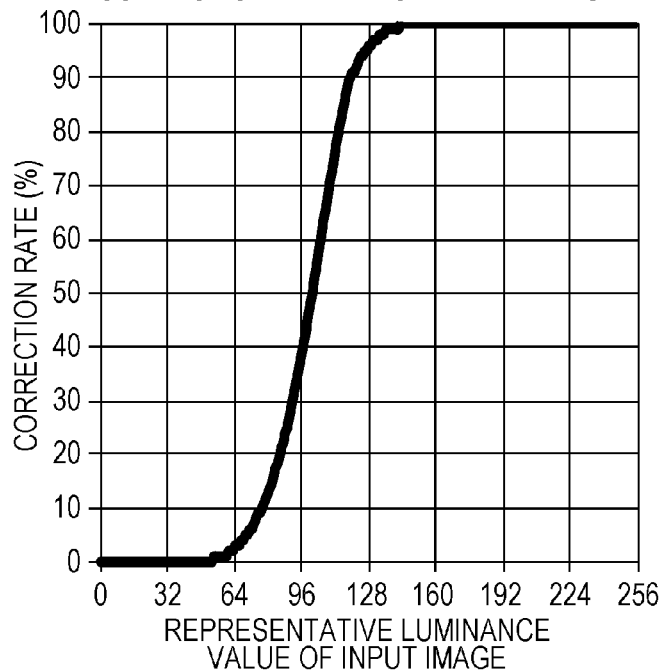
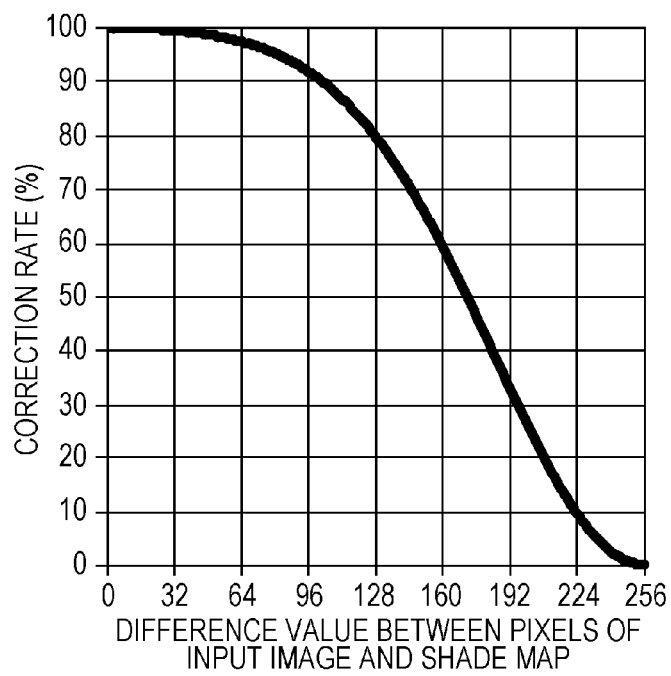

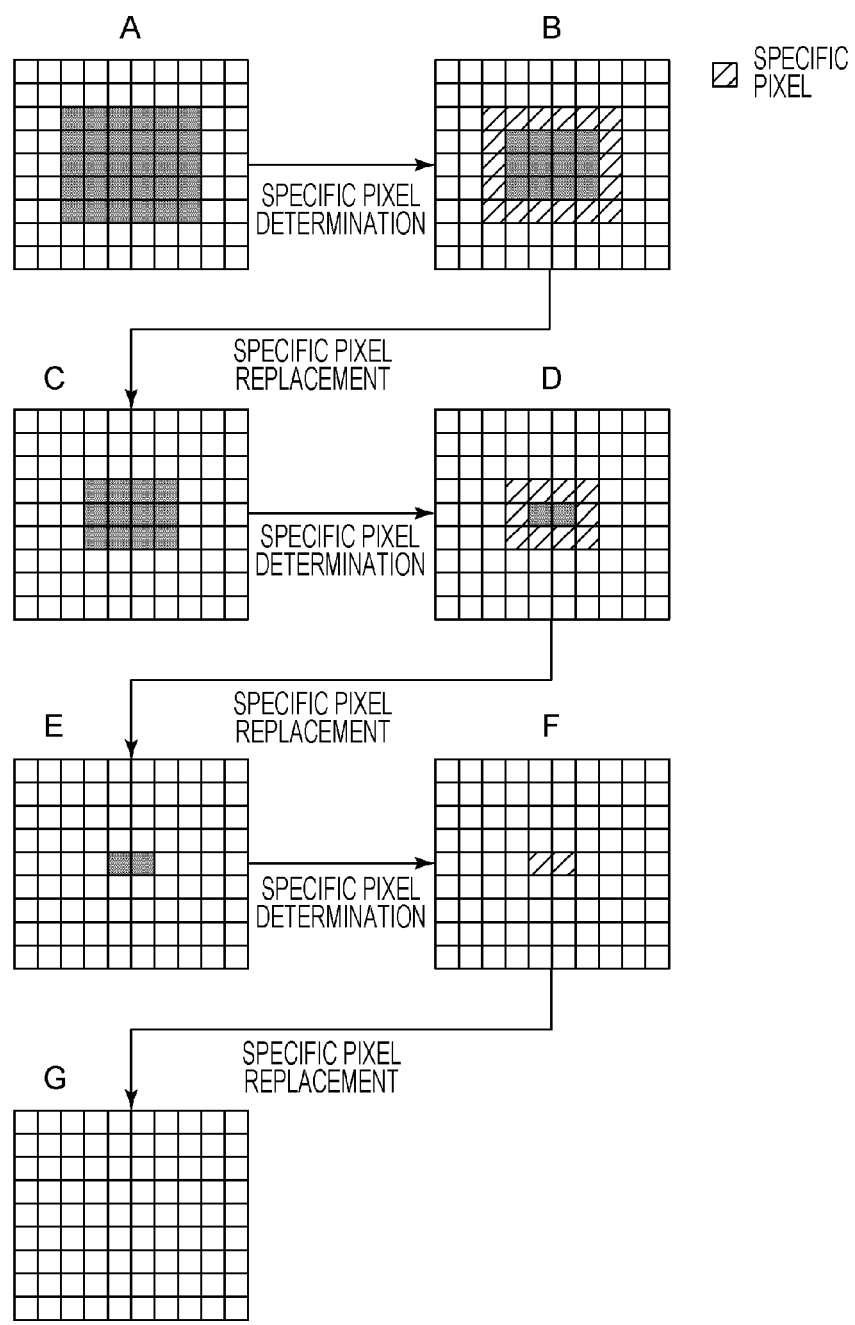

INFORMATION PROCESSING APPARATUS, METHOD FOR PROCESSING INFORMATION, AND COMPUTER PROGRAM

BACKGROUND OF THE INVENTION

Field of the Invention

The present disclosure relates to a technique for removing shade in a captured image.

Description of the Related Art

Mobile terminals, such as smartphones and tablet personal computers (PCs), having advanced information processing functions are becoming more and more popular nowadays. These mobile terminals have a camera and an image capture function. It is becoming increasingly common to capture an image of a document on a paper medium using such a camera function of a mobile terminal, and store image data of the captured image into a memory of the mobile terminal. Additionally, the combination of a mobile terminal and a printer is increasingly used to copy a document. For example, image data of a captured image is transmitted from the mobile terminal to the printer and the image is printed by the printer. If a user does not have a multifunction machine having a scanner function and a printer function, the user can copy a document using a mobile terminal and a printer in the above-described manner.

When a user captures an image of a document using a camera function of a mobile terminal, an object adjacent to the document or the user may cast shade on the document. If the user captures an image of the shaded document, the captured image may be shaded. Uneven brightness of the captured image caused by the shade will be referred to as "shade" hereinafter. The readability of the document in the shaded image is low. This leads to a reduction in quality of a printed image.

Japanese Patent Laid-Open No. 2012-95002 discloses a method for correcting shade in a document image captured with a camera. As described in Japanese Patent Laid-Open No. 2012-95002, shade components of the captured image are estimated, and the shade components are removed from the captured image based on information about the estimated shade components. According to this method, to correct shade components of a captured image, a region with a low chroma value and a low lightness value included in the captured image is detected as a character. The character is subjected to correction by a small amount. This eliminates or reduces a likelihood that the character may be corrected such that the character turns bright.

According to the method disclosed in Japanese Patent Laid-Open No. 2012-95002, however, an object in a region that is not detected as a character is subjected to correction for shade component removal regardless of the color of the object. Unfortunately, the shade component removal correction is excessively performed, so that the color of the object turns bright.

SUMMARY OF THE INVENTION

The present disclosure provides an information processing method including calculating at least one difference value between a pixel value of a target pixel in an input image obtained by capturing an image of a document and a pixel value of a corresponding pixel in a shade component image at coordinates identical to those of the target pixel. The shade component image represents shade components of the input image. The shade components depend on an image capture environment. The method further includes correcting the pixel value of the target pixel in the input image based on a correction rate to correct a shade component in the target pixel. The correction rate depends on at least one difference value associated with the target pixel in the input image.

According to other aspects of the present disclosure, one or more additional information processing methods, one or more information processing apparatuses, one or more computer programs and one or more storage mediums are discussed herein. Further features of the present disclosure will become apparent from the following description of exemplary embodiments with reference to the attached drawings.

BRIEF DESCRIPTION OF THE DRAWINGS

FIG. 3 is a block diagram of an exemplary configuration of the mobile terminal.

FIGS. 6A to 6C are flowcharts illustrating an overall process in a first embodiment.

FIG. 7 is a flowchart illustrating a reduced image correction process in the first embodiment.

FIGS. 8A and 8B illustrate exemplary look-up tables (LUTs) for correction rate adjustment.

FIG. 9 illustrates an example of correction of specific pixels in the first embodiment.

DESCRIPTION OF THE EMBODIMENTS

First Embodiment

A first embodiment of the present disclosure will be described below with reference to the drawings.

Figure 1:
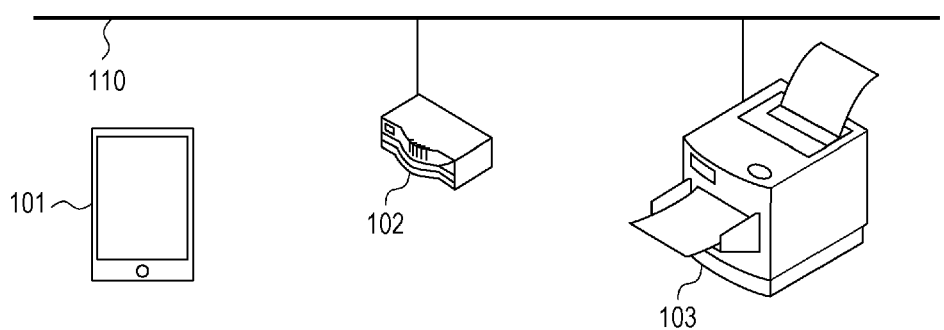
FIG. 1 is a schematic diagram of an exemplary configuration of a system in an embodiment of the present disclosure.

FIG. 1 illustrates an overall configuration of a system in the first embodiment. A wireless router 102 and a printer 103 are connected to a local area network (LAN) 110. A mobile terminal 101 can be connected to the printer 103 via the wireless router 102 and the LAN 110. Although the mobile terminal 101 is described as an example of an information processing apparatus in the present embodiment, the information processing apparatus may be, for example, a PC, a printer, or a copier. In the copier, instead of a camera, a scanner is used to obtain an image by scanning a document.

<Configuration of Mobile Terminal>

Figure 2A:
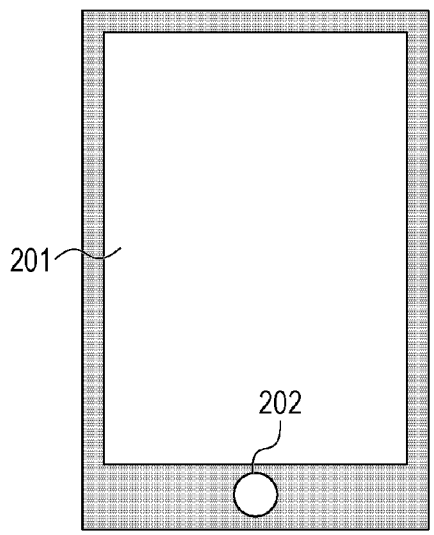
FIGS. 2A and 2B are external views of a mobile terminal.
Figure 2B:
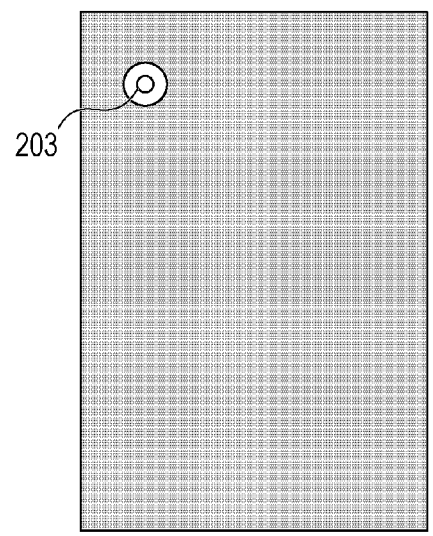

FIGS. 2A and 2B are external views of the mobile terminal 101 in the present embodiment. The mobile terminal 101 may be any of a variety of types. FIG. 2A illustrates a front surface of the mobile terminal 101. The mobile terminal 101 includes a touch panel display 201 and an operation button 202 arranged in the front surface. Specifically, the touch panel display 201 is a combined device of a display device for displaying, for example, information, a button, and an image necessary for an operation, and a position input device for receiving an input in response to a touch of a human finger or the like. FIG. 2B illustrates a rear surface of the mobile terminal 101. The mobile terminal 101 includes an image capture unit 203 disposed in the rear surface. The present embodiment is applicable to any mobile terminal that has a camera function including the image capture unit 203. Specifically, the present embodiment is applicable to a smartphone or mobile phone having a camera function and a digital camera having a communication function. Furthermore, the present embodiment is applicable to a document camera that captures an image of a document in a contactless manner.

FIG. 3 is a block diagram illustrating an exemplary configuration of the mobile terminal 101 in this embodiment. In FIG. 3, a central processing unit (CPU) 301, a random access memory (RAM) 302, and a read-only memory (ROM) 303 transmit and receive programs and data to and from each other through a data bus 311. The data bus 311 is connected to a storage unit 304, a data transmitting and receiving unit 305, an imaging unit 306, a display unit 307, an operation unit 308, an image processing unit 309, and a motion sensor 310. The CPU 301, the RAM 302, the ROM 303, the storage unit 304, the data transmitting and receiving unit 305, the imaging unit 306, the display unit 307, the operation unit 308, the image processing unit 309, and the motion sensor 310 transmit and receive programs and data to and from each other.

The storage unit 304, which is a flash memory, stores image data and various programs. The data transmitting and receiving unit 305 includes a wireless LAN controller and transmits and receives data to and from the printer 103 via the wireless router 102. The imaging unit 306, which corresponds to the above-described image capture unit (camera) 203, captures an image of a document to obtain image data. The obtained image data is processed by the image processing unit 309 or the CPU 301 through the storage unit 304 or the RAM 302. The processed image data is subjected to post-processing by the CPU 301. For example, the image data can be transmitted to the display unit 307 and an image based on the data is displayed by the display unit 307. The image data can be stored in the storage unit 304. The image data can be transmitted to an external device through the data transmitting and receiving unit 305.

The display unit 307 is included in the above-described touch panel display 201. The display unit 307 displays, for example, a live view image of a document to be captured as an image using the camera function, an image processing result in this embodiment, information necessary for notification about a process, and information necessary for an operation. The operation unit 308 includes a touch panel, which is included in the touch panel display 201, and the operation button 202. The operation unit 308 receives a user operation and transmits information about the operation to the units related to the operation. The motion sensor 310 includes a three-axis acceleration sensor, an electromagnetic compass, and a three-axis angular velocity sensor. The motion sensor 310 can detect the orientation or movement of the mobile terminal 101 using a well-known technique.

The CPU 301 runs a program stored in the ROM 303 or the storage unit 304, thus controlling the components in the mobile terminal 101.

<Configuration of Printer>

Figure 4:
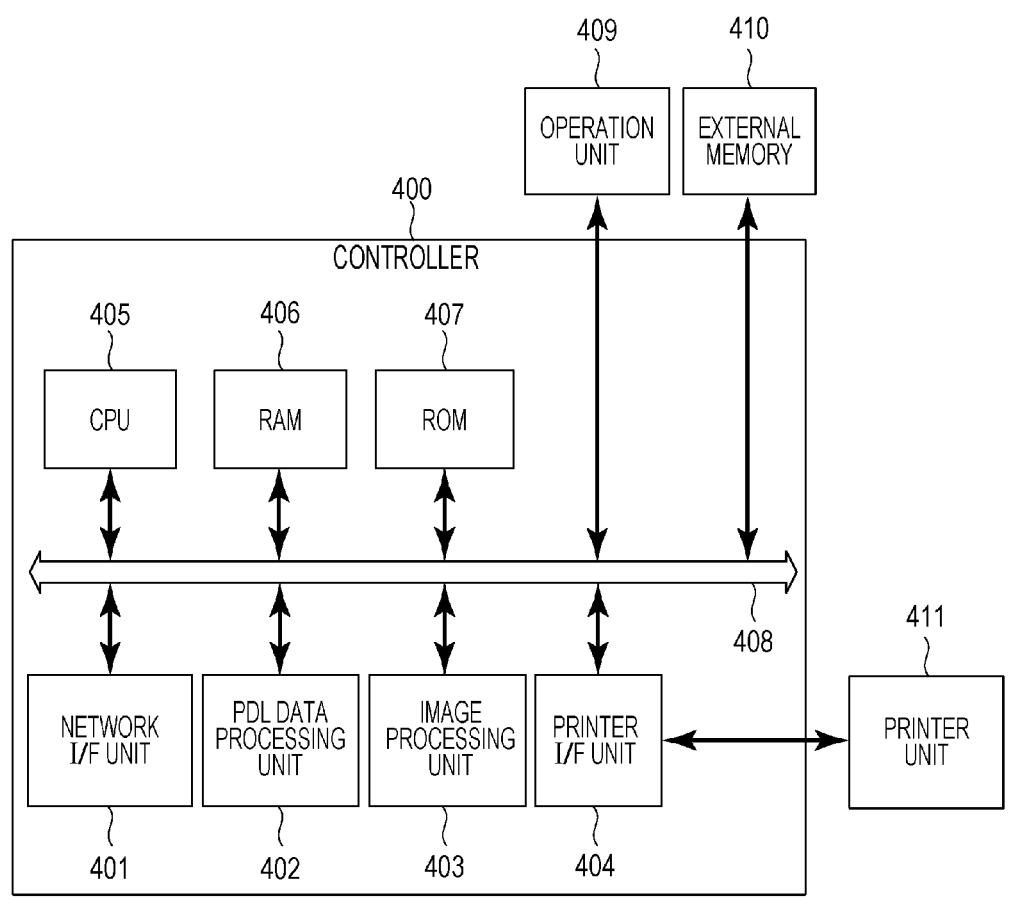
FIG. 4 is a block diagram of an exemplary configuration of a printer.

FIG. 4 is a diagram explaining an exemplary configuration of the printer 103 in the embodiment. The printer 103 includes a controller 400, an operation unit 409, an external memory 410, and a printer unit 411. The controller 400 outputs an image signal to the printer unit 411 via a printer interface (I/F) unit 404 connected to a system bus 408 in accordance with, for example, a control program. The control program is stored in a ROM 407 or the external memory 410. The ROM 407 further stores, for example, a control program for a CPU 405. The CPU 405 can communicate with the mobile terminal 101 via a network I/F unit 401 and the LAN 110. This configuration allows the printer 103 to transmit information in the printer to the mobile terminal 101 and receive, for example, image data obtained by the mobile terminal 101 from the mobile terminal 101. A RAM 406 functions as a main memory for the CPU 405 and a work area, for example.

Processed image data, indicating a captured image, transmitted from the mobile terminal 101 is supplied to the controller 400 via the network I/F unit 401. Then, a page description language (PDL) data processing unit 402 performs PDL interpretation and rendering, an image processing unit 403 performs print output image processing, and the printer unit 411 prints an image based on the processed image data.

<Detailed Description of Process>

FIGS. 6A, 6B, and 6C are flowcharts explaining a process for correcting an input image in the embodiment. The process in FIGS. 6A to 6C is executed by the mobile terminal 101 (information processing apparatus). A program for the process in FIGS. 6A to 6C is stored in the ROM 303. The CPU 301 reads the stored program and runs the program in the RAM 302, so that the process illustrated by the flowcharts in FIGS. 6A to 6C is executed.

Figure 5A:
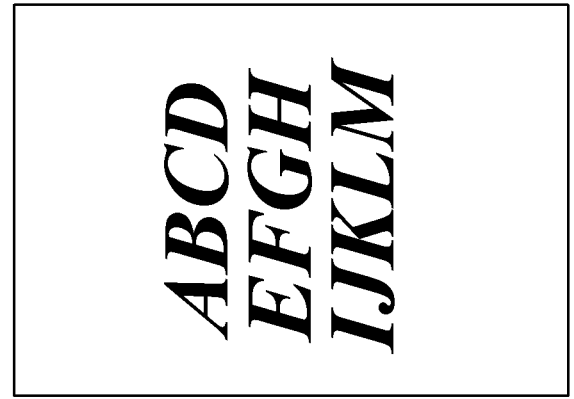
FIGS. 5A to 5C are diagrams illustrating a process in the present disclosure.

FIG. 6A depicts the flowchart of the overall process for correcting an input image. The process is started when a document image captured with the camera function including the image capture unit 203 of the mobile terminal 101, an image stored in the storage unit 304, or an image received from the external device is acquired as an input image. The process is performed on the assumption that the input image includes a document. If the input image includes a background region other than the document, a document region may be detected, the detected document region may be subjected to projective transformation such that the document region is transformed into a rectangular region, and the resultant region may be processed as an input image. FIG. 5A is an example of an input image. As seen in FIG. 5A, the input image has shade in the background of character strings.

Figure 5B:
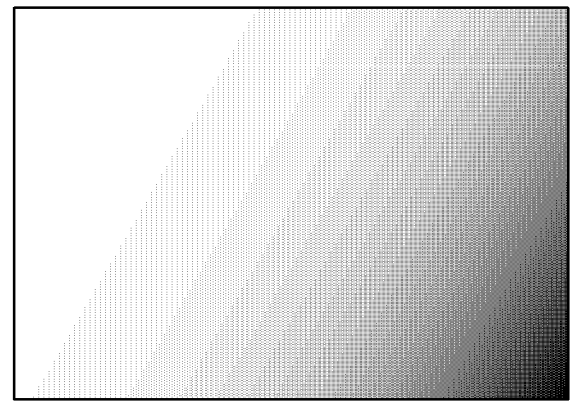

In step S610, the image processing unit 309 processes the input image to estimate shade components, which depend on an image capture environment, of the input image. The shade estimation will be described in detail later with reference to the flowcharts of FIGS. 6B and 7. FIG. 5B illustrates an example of the estimated shade components of the input image in FIG. 5A. As seen in FIG. 5B, only the shade components other than character regions are estimated.

Figure 5C:

In step S620, the image processing unit 309 removes the shade components from the input image based on information about the estimated shade components. The shade removal will be described in detail later with reference to the flowchart of FIG. 6C. FIG. 5C illustrates an example of an image obtained by removing the shade components based on the information about the shade components (FIG. 5B) estimated in the input image of FIG. 5A. Since the shade components are correctly estimated, the shade can be removed without any problems as seen in FIG. 5C.

FIG. 6B is the flowchart explaining the shade estimation process.

In step S611, the image processing unit 309 segments the input image into a plurality of blocks. In this segmentation, each block may have any shape and include any number of pixels. For example, each block may be a square such that the number of pixels arranged in a longitudinal direction of the block is the same as that in a lateral direction thereof. The number of blocks in each of the longitudinal and lateral directions of the input image may be determined such that the number of blocks ranges from 8 to 64. The number of blocks may be fixed or changed in accordance with input image conditions.

In step S612, the image processing unit 309 calculates a representative pixel value of each of the blocks obtained by segmentation. The representative pixel value is a pixel value of an RGB signal (image data represented by three color channels of red, green, and blue). To determine the representative pixel value, pixels having high luminance values are selected from input pixels included in the block and the selected pixels are used. The luminance value in this case is, for example, a Y signal in the YCbCr color space converted from the RGB color space. An L signal in the L*a*b* color space or a Y signal in the YUV color space may be used as a luminance value. The term "paper white region" as used herein refers to a region that serves as a blank region, where a blank sheet is exposed as a background, of a document. When the block includes a paper white region, the representative pixel value indicates a shade-component estimated value. The paper white region is ideally white (for 8-bit signals, R=255, G=255, and B=255). In the input image obtained by capturing an image of a document through the camera, if a paper white region is shaded, the region will not be white. In other words, pixel values of the paper white region are considered to indicate shade components. If a region other than the paper white region is shaded, the region will be darker than the paper white region. If a block includes a paper white region, therefore, a region having relatively high luminance values in the block will be estimated as a paper white region. Calculating a representative pixel value in this region can estimate shade components in the block. If the block includes no paper white region, the representative pixel value of the block will be a pixel value of the brightest object region shaded.

Examples of methods for calculating a representative pixel value of each block include a method for calculating luminance values of input pixels in each block and setting the highest luminance value to a representative pixel value of the block, a method for selecting a predetermined number of pixels of each block in the order from higher to lowest luminance values, calculating an average luminance value of these pixels, and setting the average luminance value to a representative pixel value, and a method for selecting pixels having luminance values within a predetermined range from the highest luminance value in each block or selecting pixels using a luminance value histogram, calculating an average value of pixel values of the selected pixels, and setting the average value to a representative pixel value. As a method for estimating shade components in each block, a method for clustering RGB signals in each block into clusters, calculating a cluster representative value of each of the clusters, and setting a cluster representative value having the highest luminance value to a representative pixel value may be used, though the amount of calculation in this method is large.

After the representative pixel values of all of the blocks are obtained in the above-described manner, the image processing unit 309 generates an RGB image composed of the representative pixel values of the blocks in step S613. This image composed of the representative pixel values of the blocks is a reduced image obtained by reducing the input image such that the number of pixels of the reduced image is determined by the number of blocks in the above-described segmentation. This reduced image serves as a base image to be subjected to the shade estimation process. In step S700, the image processing unit 309 performs correction processing to leave the shade components in the reduced image, serving as the base image. The reduced image correction processing will be described in detail later with reference to FIG. 7. In step S614, the image processing unit 309 enlarges the reduced image subjected to the correction processing to generate a shade map having the same size as that of the input image. The shade estimation process is terminated.

FIG. 6C is the flowchart explaining the process of removing the shade from the input image using the above-described shade map.

In step S621, the image processing unit 309 calculates a representative luminance value as a brightness component of the input image. An average value or a median value of luminance values calculated from pixels of the reduced image is determined as the representative luminance value. The representative luminance value, serving an image-background estimated value, can be calculated more accurately from the reduced image than from the input image because the reduced image is less affected by an object than the input image. In addition, the amount of calculation for the reduced image is smaller than that for the input image.

In step S622, the image processing unit 309 refers to a table stored in the storage unit 304 to determine a correction rate A associated with the representative luminance value. The correction rate A is a numeric value to be applied to the entire image. A low representative luminance value means that the input image is darker than the shade components due to an object included in the document or the background and that the document may include no or little paper white region. In such a case, a pixel value of the background or the object in the document may be used as a shade-component estimated value, the accuracy of shade component estimation may be reduced accordingly, and darker shade components (shade map) may be estimated. If correction is performed using such a shade map, overcorrection would be caused. For this reason, when the representative pixel value is low, the correction rate is reduced. This prevents overcorrection.

FIG. 8A illustrates an exemplary graph that represents the table referred in step S622. The axis of ordinates of the graph represents the correction rate to be applied to the shade components estimated in the shade removal process. For example, when a representative luminance value of the input image is 32, namely, the input image is very dark, the correction rate is 0%. This means that correction (shade removal) is not performed regardless of a state of the shade map. As described above, if the representative luminance value is very low, there is a high possibility that the estimated shade components (shade map) may include shade components in a dark background. In this case, the shade removal process is not performed, thus preventing correction such that the dark background turns to white.

In step S623, the image processing unit 309 calculates a difference between a value of a target pixel included in the input image and a value of a corresponding pixel in the shade map located at the same coordinates as those of the target pixel such that the difference is obtained for each of pixels of the input image. In this embodiment, it is assumed that the input image and the shade map for difference calculation are in the RGB image format. The difference is calculated for each of R, G, and B channels. For example, it is assumed that a pixel value (of a target pixel) at certain coordinates in the input image is indicated by (Rin (red component), Gin (green component), Bin (blue component)) and a pixel value at the same coordinates in the shade map is indicated by (Rmap (red component), Gmap (green component), Bmap (blue component)). Difference values obtained are |Rin−Rmap|, |Gin−Gmap|, and |Bin−Bmap|. The symbol |*| denotes an absolute value. Since only one difference value is used, the largest value of the difference values of R, G, and B components is selected and the selected difference value is used as a difference value associated with the target pixel. As a method for obtaining a difference value, RGB values of the input image and those of the shade map may be converted into values for the L*a*b* color space and a color difference ΔE may be obtained for each pixel, though the amount of calculation is large. Luminance difference ΔL in the L*a*b* color space may be obtained for each pixel.

In step S624, the image processing unit 309 refers to a table stored in the storage unit 304 to determine a correction rate B associated with the difference value, or the correction rate B for the target pixel. The correction rate B is a numeric value that is determined in association with a difference value obtained for each pixel and is applied to the pixel. FIG. 8B illustrates an exemplary graph that represents the table referred in step S624. The axis of ordinates of the graph represents the correction rate to be applied to a shade component estimated in the shade removal process as in FIG. 8A. For example, when the difference value between a certain pixel in the input image and the corresponding pixel in the shade map is 128, the correction rate is 80%. When the difference value between the input image and the shade map is 128, it is estimated that the pixel is included in an object in the document, because the pixel value of the input pixel is significantly different from the pixel value of an estimated shade component. If the estimated shade component is simply corrected, the color of the object would probably be impaired. The correction rate for the shade component is therefore set to 80%. For example, when the difference value between a certain pixel in the input image and the corresponding pixel in the shade map is 0, the correction rate is 100%. In this case, it is estimated that there is no difference between the pixel value in the input image and the pixel value of a corresponding estimated shade component, namely, the pixel is included in a paper white portion of the document. The correction rate for the shade component is set to 100%.

FIG. 8B illustrates the relationship in which as the difference value between a pixel value of a pixel in the input image and that of the corresponding pixel in the shade map increases, the correction rate decreases. The relationship may be linear such that as the difference value increases, the correction rate linearly decreases.

In step S625, the image processing unit 309 performs correction to remove (whiten) a shade component in each of the pixels of the input image using the input image, the shade map, and the correction rates A and B. For correction to remove the shade components, the pixel values of the input image are corrected using the correction rates for the pixels of the input image and the pixel values of the shade map. Assuming that calculation is performed on 8-bit image data per channel, shade-map pixel component values based on the correction rate for a pixel k included in the input image are given by Expressions (1) and (2) as follows.

$$R'map(k) = 255 - (255 - Rmap(k)) \times \frac{A}{100} \times \frac{B(k)}{100} \quad (1)$$

$$G'map(k) = 255 - (255 - Gmap(k)) \times \frac{A}{100} \times \frac{B(k)}{100}$$

$$B'map(k) = 255 - (255 - Bmap(k)) \times \frac{A}{100} \times \frac{B(k)}{100}$$

Pixel component values of the pixel k are converted using these values as follows.

$$Rout(k) = Rin(k) \times \frac{255}{R'map(k)} \quad (2)$$

$$Gout(k) = Gin(k) \times \frac{255}{G'map(k)}$$

$$Bout(k) = Bin(k) \times \frac{255}{B'map(k)}$$

The above-described processing using these expressions allows pixel component values higher (brighter) than the pixel component values R'map(k), G'map(k), and B'map(k) to indicate 255. Each of the pixels in the input image is subjected to this processing, so that an image subjected to shade removal is output.

FIG. 7 is a flowchart explaining details of the reduced image correction process (S700).

In step S701, the image processing unit 309 determines the presence or absence of a pixel having a pixel value within a first color range in the reduced image. The term "first color range" as used herein refers to a range of colors considered to be indicated by pixel values obtained by capturing an image of a blank sheet under various conditions, or a range of colors considered to indicate a paper white portion. As regards a method for setting the color range, for example, in the use of the YCbCr color space, the first color range is within a predetermined distance, defined by a certain threshold value, from the value (Cb, Cr)=(0, 0) that indicates an achromatic color. If there is at least one pixel (having Cb and Cr values within the threshold distance from the achromatic color) within the first color range, the image processing unit 309 determines "YES" in step S701. If there is no pixel within the first color range, the image processing unit 309 determines "NO" in step S701.

In step S702, the image processing unit 309 calculates a color component representative value of the reduced image. The term "color component representative value" as used herein refers to a value that is estimated from an input image as a color component value obtained by capturing an image of a blank sheet. This value indicates a shade color component and also indicates a color to be converted into white by the shade removal process, which will be performed later. The color component representative value is calculated based on pixel values within the above-described first color range. In this case, an average of color component values within the first color range is defined as the color component representative value.

In step S704, the ratio of pixels having color component values different from the color component representative value calculated in step S702 by a first threshold value or more to the pixels of the reduced image is calculated. In other words, the ratio of a region that is not a paper white region to the input image is obtained. As regards the distance for color components, a distance in the Cb-Cr space may be used.

In step S705, the image processing unit 309 determines whether the ratio calculated in step S704 is greater than or equal to a second threshold value. If NO in step S705, or if the ratio of the paper white region to the input image exceeds a predetermined value, it can be estimated that the input image is obtained by capturing an image of a document whose background is white. Thus, the image processing unit 309 determines that a fundamental color of the input image is white (S706). If YES in step S705, or if the ratio of the region that is not the paper white region to the input image is greater than or equal to a predetermined value, it can be estimated that the document captured as an image does not have a white background, for example, the document is on a colored sheet or includes one or more chromatic color objects over a wide range. Thus, the image processing unit 309 determines that the fundamental color of the input image is not white (S707).

The case where the image processing unit 309 determines "NO" in step S701 will now be described. In step S703, the image processing unit 309 defines the color component representative value as the achromatic color ((Cb, Cr)=(0, 0)). The reason is as follows. Since a color component value obtained by capturing an image of a blank sheet cannot be estimated from the input image, color component conversion by the shade removal process is not performed. In addition, the input image in this case includes no paper white region. In step S707, the image processing unit 309 determines that the fundamental color of the input image is not white.

In step S708, the image processing unit 309 refers to color component values of all of the pixels of the reduced image to determine, as a specific pixel, a pixel having a color component value different from the color component representative value calculated in step S702 by a predetermined threshold value (third threshold value) or more. The term "specific pixel" as used herein refers to a pixel that represents a region other than a paper white region in the reduced image. The specific pixel is a pixel whose value is to be replaced by using a pixel estimated to represent a neighboring paper white region. In this step, a region having color component values significantly different from the representative value, namely, a region having a color distinctly different from a blank sheet is identified as a group of specific pixels.

In step S709, the image processing unit 309 calculates an average luminance value of the reduced image at this point.

In step S710, the image processing unit 309 refers to luminance component values of all of the pixels of the reduced image to determine whether a pixel having a luminance value different from the average luminance value, calculated in step S709, by a fourth threshold value or more is included in an edge of an object. Whether such a pixel is included in an edge may be determined by using any of known edge determination methods. In this determination, a pixel determined as an edge is a "dark edge" pixel (dark edge determination) because the pixel is darker than its neighboring pixels. As regards a pixel determined as a "bright edge" pixel (bright edge determination) because the pixel is brighter than its neighboring pixels, the bright edge pixel is ignored. The reason is that a region that is less likely to be a paper white region is considered to be darker than the paper white region. A pixel that has a luminance value different from the average luminance value by the fourth threshold value or more and that is determined as a dark edge pixel is determined as a specific pixel. The specific pixel in step S710 is an edge pixel that has a luminance value different from the average luminance value and luminance values of its neighboring pixels and that is less likely to represent the paper white region. The reason is that the paper white region is likely to have a small difference from the average luminance value and is also likely to have no rapid change in luminance because of the presence of only the shade component. The fourth threshold value may be zero and specific pixel determination may be performed only based on whether a target pixel is included in an edge.

In step S711, the image processing unit 309 determines the presence or absence of a specific pixel determined in steps S708 and S710. If YES, or it is determined that there is a specific pixel, the process proceeds to step S712.

In step S712, the image processing unit 309 replaces the luminance value of the specific pixel by a luminance value obtained from its neighboring pixels. This processing means replacement of the luminance value of the specific pixel, determined as being not included in the paper white region, with a luminance value calculated from its neighboring pixels estimated to be included in the paper white region. Actually, for example, a method may be used which includes selecting pixels that have higher luminance values than a processing target pixel by a predetermined value or more and that are not specific pixels from a plurality of pixels adjacent to the target pixel, calculating an average of the luminance values of the selected pixels, and determining the average as a luminance value for the target pixel. If there is no adjacent pixels to be selected, an unprocessed specific pixel, which is not subjected to replacement, will be left. This processing is repeated until there is no unprocessed specific pixel (step S713). A specific pixel may be left depending on conditions. In such a case, after the processing is repeated a predetermined number of times, replacement conditions may be changed so that the left specific pixel can be processed. For example, an average of luminance values of all of the adjacent pixels may be used as a luminance value for the processing target pixel.

In the above-described steps, the replacement of the luminance values of the pixels in the region distinctly different in color from a blank sheet and an edge region is complete. When the input image includes an object having a relatively large area, pixels in only the edge are subjected to replacement and pixels inside the object remain unprocessed. The process returns to step S709. In steps S709 and S710, specific pixel determination for an edge is again performed. In step S712, a luminance value of the determined specific pixel is subjected to replacement. By repeating these steps, the pixels corresponding to the object are subjected to replacement based on information about the paper white region surrounding the object. For the specific pixel determination in step S710, if there is no specific pixel to be subjected to replacement, it is determined as NO in step S711. The process proceeds to step S714. Alternatively, if the number of specific pixels is lower than a predetermined value, it may be determined as NO in step S711.

A region that is included in pixel regions subjected to specific pixel determination and that is likely to be a paper white region may be excluded from a target for specific pixel determination in step S710, thus increasing processing speed. The term "region that is likely to be a paper white region" as used herein refers to a region that is likely to have been correctly subjected to replacement such that luminance values set by replacement are within a predetermined range from the average luminance value. In addition to increasing the processing speed, such processing can prevent a shade estimation error caused by noise pixels from spreading over a large area due to the repeated processing.

FIG. 9 illustrates an exemplary processing flow. Part A of FIG. 9 illustrates a first input image in step S709. The input image includes a rectangular object region, in which pixel values do not indicate correct shade-component estimated values. An uncolored portion corresponds to a paper white region, in which correct shade components are estimated. Part B of FIG. 9 illustrates a result of specific pixel determination in steps S709 and S710. In part B, a hatched portion corresponds to pixels determined as specific pixels. Pixels in an edge portion of the rectangular region are determined as specific pixels. Part C of FIG. 9 illustrates a result of replacement of the specific pixels with pixels in the paper white region surrounding the specific pixels in step S712. Although the rectangular object region remains, this region is reduced in size as seen from part C of FIG. 9. The image of part C of FIG. 9 corresponds to a second input image in step S709. Part D of FIG. 9 illustrates a result of second specific pixel determination in steps S709 and S710. Part E of FIG. 9 illustrates a result of second replacement of specific pixels with pixels in a paper white region surrounding the specific pixels in step S712. As seen from part E of FIG. 9, the rectangular region is further reduced in size. The image of part E of FIG. 9 corresponds to a third input image in step S709. Part F of FIG. 9 illustrates a result of third specific pixel determination in steps S709 and S710. Part G of FIG. 9 illustrates a result of third replacement of specific pixels with pixels in a paper white region surrounding the specific pixels in step S712. As seen from part G of FIG. 9, the rectangular region has disappeared. Although the image of part G of FIG. 9 corresponds to a fourth input image in step S709, specific pixel determination is not performed in steps S709 and S710, the number of specific pixels is determined as zero in step S711, the process branches to step S714, and the repeated processing is then terminated. This repeated processing enables replacement in a large object region using neighboring pixels with no problems.

In step S714, the image processing unit 309 determines a gain adjustment value for a luminance component based on fundamental color information. For example, assuming that the fundamental color is white, the area of a paper white region is large and shade components can be accurately estimated based on an input image. Since the estimated shade components are indicated by representative values of respective blocks, some blocks may include darker shade. The gain adjustment value is therefore determined to enhance shade removal (or make the image brighter) in accordance with a shade luminance component distribution. When the fundamental color is not white, there is no or little paper white region. The accuracy of shade estimation may be low, such that estimated shade components are likely to include a background or an object color. If the estimated shade components are simply removed, overcorrection would be caused. The gain adjustment value is therefore determined so that shade removal based on the shade luminance component distribution is moderately performed to prevent excessive conversion. In step S715, the image processing unit 309 multiplies a luminance value of each of the pixels included in the reduced image by the gain adjustment value determined in step S714, thus converting the luminance component value of each pixel.

In step S716, the image processing unit 309 replaces the color component value of each of the pixels with the color component representative value determined in step S702 or S703.

The above-described process removes an object element from the reduced image to generate an image with a converted shade component distribution. The image finally generated is an RGB image. Since luminance components and color components are subjected to correction and replacement during the process, the image may be converted into a YCbCr image, the YCbCr image may be subjected to the process of FIG. 7, and the processed image may be finally converted into an RGB image. Alternatively, YCbCr values may be calculated from RGB values on a pixel-by-pixel basis in each of the steps. If YCbCr values are corrected, the corrected values may be converted into RGB values.

According to the first embodiment, as the difference in value between a pixel in an input image and the corresponding pixel in a shade component image (shade map) increases, the amount of correction for shade component removal decreases. This prevents overcorrection of shade components in an object included in a captured image.

Second Embodiment

According to the method of the above-described first embodiment, overcorrection in shade removal is prevented by adjusting correction amounts based on differences in pixel value between a shade map and an input image. Shade removal in the first embodiment makes shade in the input image bright in an appropriate manner. In contrast, according to a method of a second embodiment, to improve readability of a black character of a document included in an input image, a correction rate for a pixel value having a color component close to achromatic colors is adjusted, and the pixel value is converted such that the pixel value indicates a darker color than an input pixel value indicates. A description of the same components as those in the first embodiment is omitted.

Figure 10:
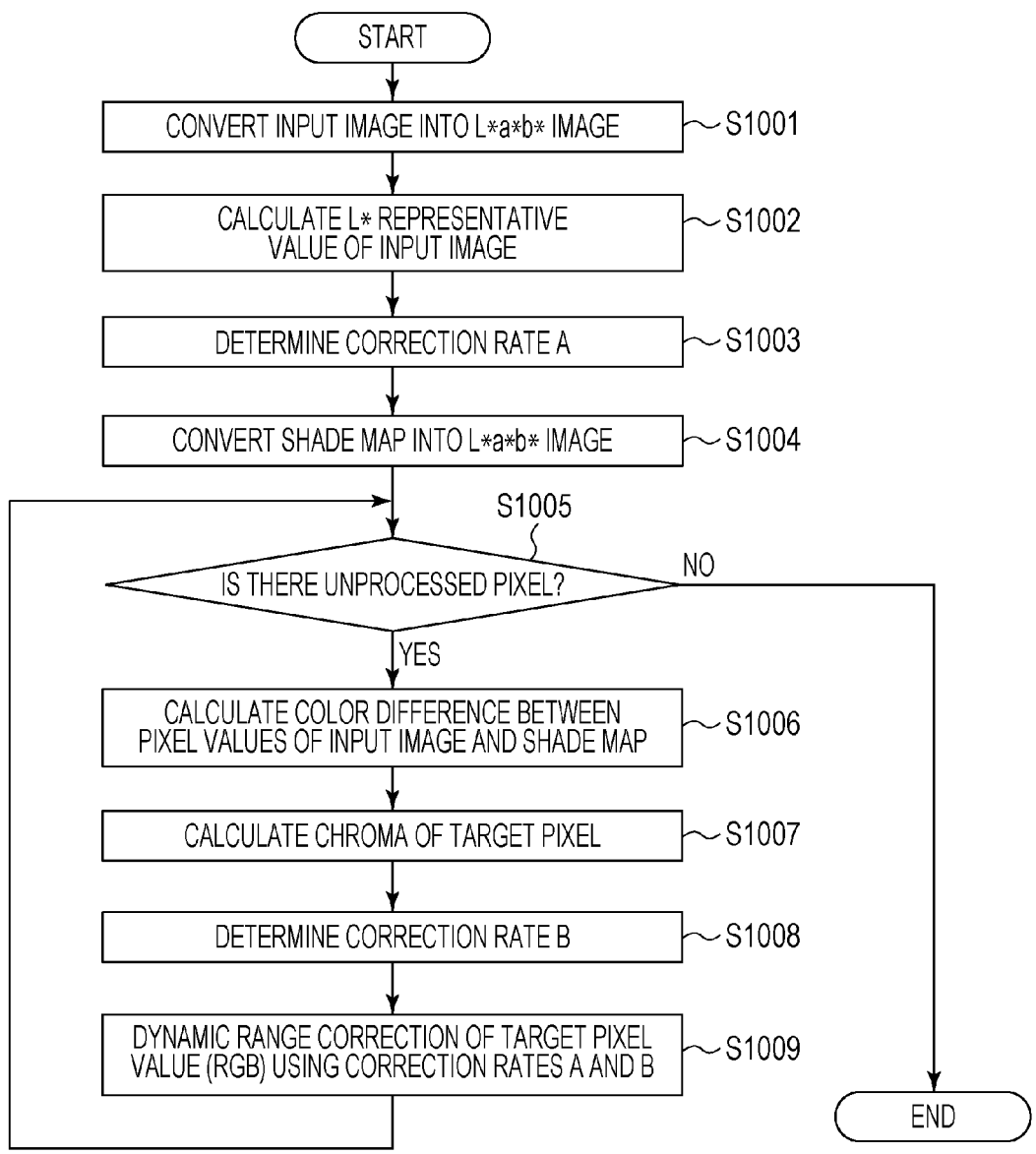
FIG. 10 illustrates a flowchart of a process in a second embodiment.

FIG. 10 is a flowchart explaining a process according to the second embodiment. This process is performed instead of the shade removal process (FIG. 6C) in the first embodiment.

In step S1001, the image processing unit 309 converts an RGB input image into an L*a*b* image. In step S1002, the image processing unit 309 calculates a representative luminance value of the input image. This value may be calculated from a result of conversion into the L*a*b* image in step S1001. Alternatively, the value may be calculated from a reduced image in the same way as in the first embodiment. In step S1003, the image processing unit 309 determines the correction rate A for the representative luminance value calculated in step S1002. This correction rate A is determined based on, for example, the table represented by the graph of FIG. 8A in the same way as in the first embodiment.

In step S1004, the image processing unit 309 converts an RGB shade map into an L*a*b* image. Step S1005 and the following steps are executed for each pixel until there is no unprocessed pixel. In step S1005, the image processing unit 309 determines the presence or absence of an unprocessed pixel. If there is no unprocessed pixel, the process is terminated. If there is an unprocessed pixel, the process proceeds to conversion processing for the unprocessed pixel.

In step S1006, the image processing unit 309 calculates a color difference $\Delta E$ between a pixel value (Lin, ain, bin) at certain coordinates of the input image and a pixel value (Lmap, amap, bmap) at the same coordinates of the shade map image by using Expression (3).

$$\Delta E = \sqrt{(Lin - L\text{map})^2 + (a\text{in} - a\text{map})^2 + (b\text{in} - b\text{map})^2} \quad (3)$$

In step S1007, the image processing unit 309 calculates chroma C* from the pixel value of a processing target pixel by using Expression (4).

$$C^* = \sqrt{a\text{in}^2 + b\text{in}^2} \quad (4)$$

Figure 11A:
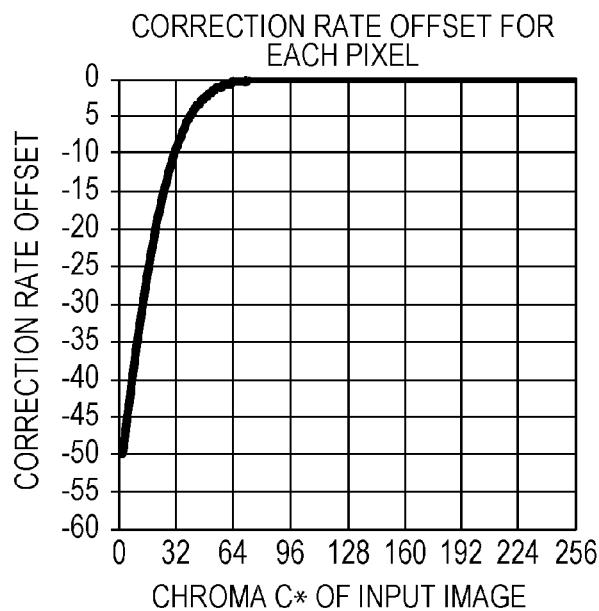
FIGS. 11A and 11B illustrate exemplary LUTs for correction rate adjustment in the second embodiment.
Figure 11B:
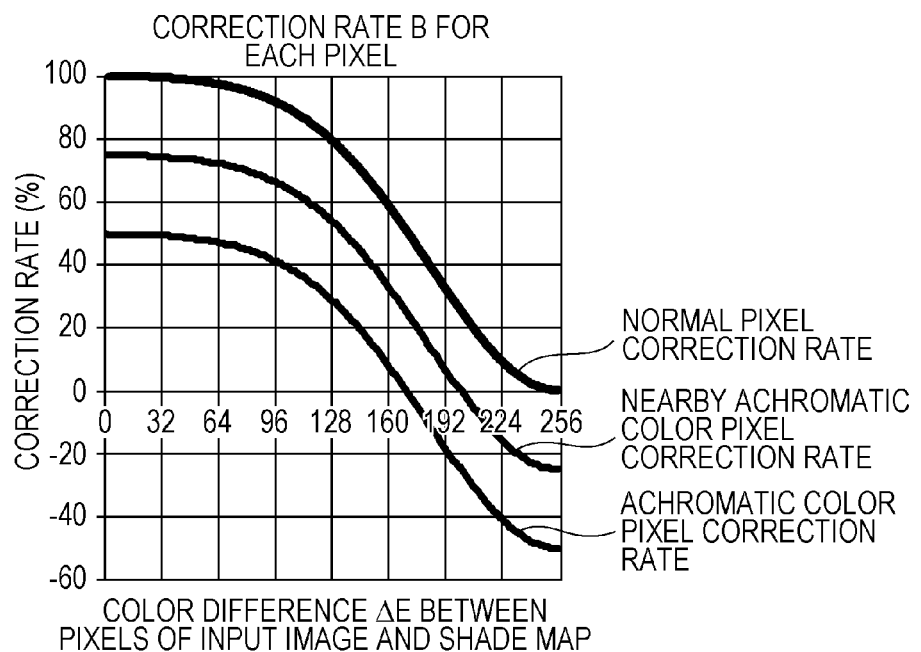

In step S1008, the image processing unit 309 determines the correction rate B based on the color difference ΔE calculated in step S1006 and the chroma C* calculated in step S1007. The correction rate B is based on FIG. 8B described in the first embodiment and is adjusted with an offset value associated with the chroma C* of the processing target pixel. FIG. 11A is a graph illustrating the relationship between the chroma C* and the offset value. FIG. 11A illustrates adjustment in which as the chroma C* is lower (closer to achromatic colors), a negative offset value is larger, namely, the correction rate is lower. FIG. 11B is a graph illustrating correction rates B for three types of chroma. A normal pixel correction rate is a correction rate for a pixel having a sufficiently large chroma value C*. This correction rate is identical to that of FIG. 8B. A nearby achromatic color pixel correction rate is a correction rate for a pixel having a chroma value C*=16. An achromatic color pixel correction rate is a correction rate for a pixel having a chroma value C*=0, namely, representing an achromatic color.

In step S1009, the image processing unit 309 performs dynamic range correction using the correction rates determined in steps S1003 and S1008. Assuming that the processing target pixel represents an achromatic color and the correction rate B is a negative value, the reason why an output pixel value is corrected such that it is lower than (or indicates a darker color) than an input pixel value will now be described. When the R channel in the conversion expression in the first embodiment is used as an example, the value of the pixel k in the shade map corrected by using the correction rate is expressed as follows.

$$R'map(k) = 255 - (255 - Rmap(k)) \times \frac{A}{100} \times \frac{B(k)}{100} \quad (5)$$

Since the value B(k) is negative, the value R'map(k) is greater than 255. This value is used to calculate a pixel value of the pixel k in the input image using Expression (6).

$$Rout(k) = Rin(k) \times \frac{255}{R'map(k)} \quad (6)$$

Thus, Rout(k)<Rin(k). Consequently, the conversion is performed such that the output pixel value indicates a darker color than the input pixel value.

As described above, the correction amount can be adjusted based on the chroma of an input pixel value. The shade removal process can be performed while preventing overcorrection of, for example, black characters of a document, without deteriorating readability.

Third Embodiment

In the first embodiment, two preset coefficients are provided as gain adjustment values used to adjust the intensity of shade removal after specific pixel correction with luminance values of the reduced image. Any of these coefficients is used based on whether the fundamental color is white. A third embodiment provides a method for setting more gain adjustment values to increase the accuracy of shade removal. A description of the same components as those in the first embodiment is omitted.

Figure 12:
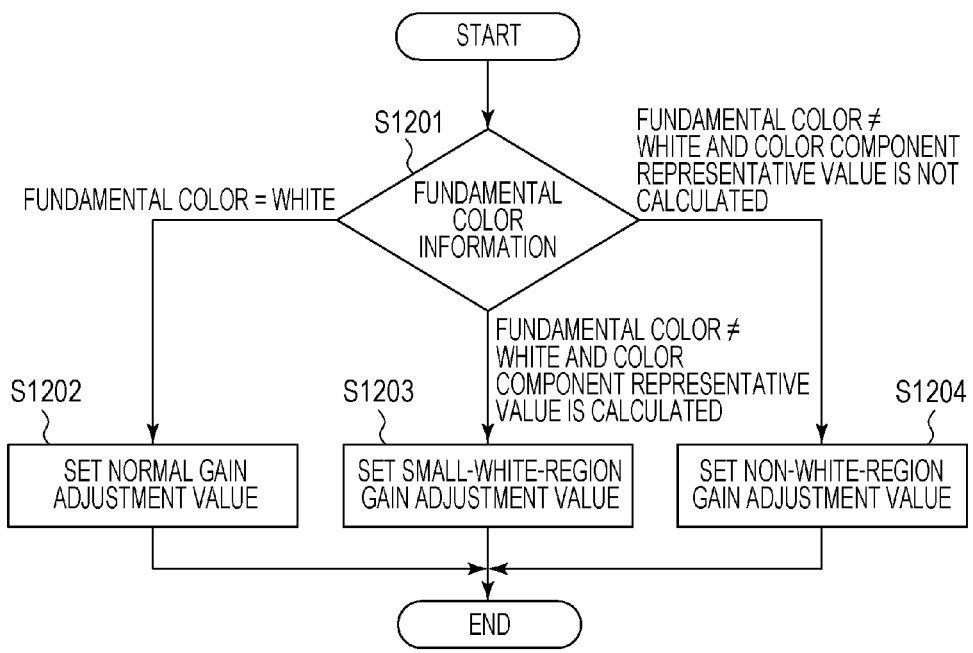
FIG. 12 is a flowchart of a process in a third embodiment.

FIG. 12 is a flowchart explaining a process in the third embodiment. This process corresponds to the processing (S714) of determining a gain adjustment value based on fundamental color information in the first embodiment. Steps other than step S714 are the same as those in the flowchart of FIG. 7.

A gain adjustment value is used to adjust the brightness of an image (luminance component distribution image) representing a shade distribution obtained in the processing up to step S713 by processing luminance values of a reduced image. When the gain adjustment value is 1, the luminance component distribution image is not changed. When the gain adjustment value is less than 1, the luminance component distribution image becomes darker. In the following shade removal process, an input image is converted to a brighter image than that obtained by using a gain adjustment value of 1. When the gain adjustment value is greater than 1, the luminance component distribution image becomes brighter. In the following shade removal process, the input image is converted to a darker image than that obtained by using the gain adjustment value of 1.

In step S1201, the image processing unit 309 refers to the fundamental color information. The process branches in accordance with the fundamental color information. When the fundamental color is white, the process proceeds to step S1202, where the image processing unit 309 sets a normal gain adjustment value. The normal gain adjustment value is used when adjustment is not performed on the assumption that shade components in a captured image of a blank sheet are correctly estimated, and is typically defined as 1. Since the estimated shade components are obtained for each block, the normal gain adjustment value in this case is set to a value slightly less than 1, for example, 0.95 in order to control darker shade which may be included in the block.

When the fundamental color is not white and a color component representative value is not calculated, the process proceeds to step S1204. The image processing unit 309 sets a non-white-region gain adjustment value. The non-white-region gain adjustment value is used when an input image does not include a region estimated to be a paper white region of a document. Since there is no paper white region, the luminance component distribution image formed in the process up to this point contains luminance components corresponding to colors that should not be removed as shade. However, it is difficult to separate luminance components affected by shade caused upon image capture from luminance components corresponding to colors that should not be removed as shade. The luminance component distribution image is therefore adjusted with a predetermined gain adjustment value, thus reducing the intensity of shade removal. The predetermined gain adjustment value is set to, for example, 1.10.

When the fundamental color is not white and the color component representative value is calculated, the process proceeds to step S1203. The image processing unit 309 sets a small-white-region gain adjustment value. In this case, the input image includes a small region estimated to be a paper white region of the document. The accuracy of estimation of shade-affected luminance components in this region is accordingly high. However, most other regions contain luminance components corresponding to colors that should not be removed as shade. Although the small-white-region gain adjustment value may be fixed to the non-white-region gain adjustment value, the small-white-region gain adjustment value is changed based on a pixel value of the input image in accordance with luminance component information about the small paper white region, thus adjusting the intensity of shade removal more appropriately.

Figure 13:
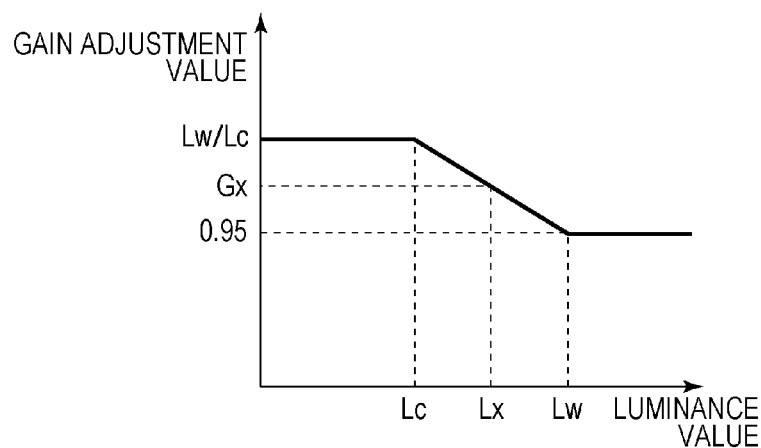
FIG. 13 is an exemplary graph illustrating gain adjustment values in the third embodiment.

FIG. 13 is a graph illustrating gain adjustment values in this case. A value Lw is a representative value of luminance components calculated from the luminance component information about the above-described small paper white region. For example, the value Lw is defined as an average value of luminance components of pixels determined to be included in the paper white region. More specifically, this value is defined as an average value of luminance values of pixels that are within the first color range used in step S701 in FIG. 7 and that have luminance values considered to indicate darkness of typical shade caused upon image capture of a blank sheet. A value Lc is a representative value of luminance components calculated from regions other than the paper white region. For example, luminance values of pixels outside the first color range are used. Among them, luminance values of the top predetermined percent (for example, 30%) bright pixels are selected. An average of these luminance values is defined as the representative value Lc. It is assumed that when a pixel has a luminance value higher than the representative value Lw of the paper white region, shade in this pixel can be estimated correctly. This pixel is adjusted with a gain adjustment value of 0.95, which is the same as the normal gain adjustment value. A pixel having a luminance value lower than the representative value Lc of the regions other than the paper white region can be estimated to contain a luminance component corresponding to a color that is not shade. This pixel can be adjusted with 1.10, which is the same as the non-white-region gain adjustment value. Alternatively, the gain adjustment value may be defined as Lw/Lc so that the value Lc is adjusted to brighter, or closer to the value Lw, since the representative value Lw of the small paper white region, which is at a different location from the region for the value Lc, is obtained. The gain adjustment value for a pixel having a luminance value ranging from the value Lc to the value Lw is changed in the range from 0.95 to Lw/Lc based on the luminance value. In FIG. 13, the gain adjustment value is changed linearly. A gain adjustment value Gx for a luminance value Lx is given by Expression (7).

$$Gx = \frac{Lw}{Lc} - \frac{Lx - Lc}{Lw - Lc} \times \left(\frac{Lw}{Lc} - 0.95\right) \quad (7)$$

As described above, an input image is classified into three types: the first type in which the input image includes a large paper white region, the second type in which the input image includes a small paper white region, and the third type in which the input image includes no paper white region. The brightness of an estimated shade component is adjusted for the type of the input image. Thus, the intensity of removal of the shade components can be appropriately controlled. This results in an increase in accuracy of removing shade, caused upon image capture, from an input image.

According to the present disclosure, when shade components of a captured image are corrected, shade components in an object included in the captured image can be prevented from being excessively corrected.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2015-140042, filed Jul. 13, 2015, which is hereby incorporated by reference herein in its entirety.

What is claimed is:

1. A method for image processing, the method comprising:
obtaining an input image including a shade component by capturing a document;
estimating a shade component image, the shade component image representing the shade component of the input image, the shade component depending on an image capture environment in which the document has been captured;
calculating at least one difference value between a pixel value of a target pixel in the input image and a pixel value in the shade component image at coordinates identical to those of the target pixel; and
correcting the pixel value of the target pixel in the input image based on the pixel value in the shade component image and a correction rate to remove a shade component in the target pixel, the correction rate depending on the difference value associated with the target pixel in the input image, wherein as the difference value increases, the correction rate decreases.

2. The method according to claim 1, wherein in the calculating, the calculated at least one difference value comprises a plurality of calculated difference values including: a difference value between a red component of the target pixel in the input image and a red component of the corresponding pixel in the shade component image, a difference value between a green component of the target pixel in the input image and a green component of the corresponding pixel in the shade component image, and a difference value between a blue component of the target pixel in the input image and a blue component of the corresponding pixel in the shade component image.

3. The method according to claim 2, wherein in the correcting, the pixel value of the target pixel in the input image is corrected based on a correction rate that depends on the largest one of the calculated difference values of the red, green, and blue components.

4. The method according to claim 1, wherein in the correcting, the shade component of the input image is corrected such that the shade component turns to white.

5. The method according to claim 1, wherein in the correcting, the shade component is corrected based on a correction rate that depends on brightness of the input image.

6. The method according to claim 5, wherein as the brightness of the input image decreases, the correction rate decreases.

7. The method according to claim 1, wherein the pixel value in the input image contains a shade component that depends on the image capture environment.

8. An image processing apparatus comprising:
   a memory storing instructions;
   an image obtaining device that operates to obtain an input image including a shade component by capturing a document;
   one or more processors which execute the instructions and operate to:
   estimate a shade component image, the shade component image representing the shade component of the input image, the shade component depending on an image capture environment in which the document has been captured;
   calculate at least one difference value between a pixel value of a target pixel in the input image and a pixel value in the shade component image at coordinates identical to those of the target pixel; and
   correct the pixel value of the target pixel in the input image based on the pixel value in the shade component image and a correction rate to remove a shade component in the target pixel, the correction rate depending on the difference value associated with the target pixel in the input image, wherein as the difference value increases, the correction rate decreases.

9. A non-transitory computer-readable recording medium storing at least one program that causes a computer to execute a method for image processing, the method comprising:
   obtaining an input image including a shade component by capturing a document;
   estimating a shade component image, the shade component image representing the shade component of the input image, the shade component depending on an image capture environment in which the document has been captured;
   calculating at least one difference value between a pixel value of a target pixel in the input image and a pixel value in the shade component image at coordinates identical to those of the target pixel; and
   correcting the pixel value of the target pixel in the input image based on the pixel value in the shade component image and a correction rate to remove a shade component in the target pixel, the correction rate depending on the difference value associated with the target pixel in the input image, wherein as the difference value increases, the correction rate decreases.

* * * * *